United States Patent [19]

Tamai et al.

[11] Patent Number: 5,174,635
[45] Date of Patent: Dec. 29, 1992

[54] HYDRAULIC BRAKING PRESSURE CONTROL SYSTEM FOR REAR WHEEL BRAKE

[75] Inventors: Naotoshi Tamai, Nagano; Yoichi Sugimoto, Saitama; Yoshihiro Iwagawa, Saitama; Kougyoku Go, Saitama, all of Japan

[73] Assignees: Nissin Kogyo Co., Ltd., Ueda, Japan; Honda Giken Kogyo Kabushiki Kaisha, Tokyo, Japan

[21] Appl. No.: 763,011

[22] Filed: Sep. 20, 1991

[30] Foreign Application Priority Data

Sep. 25, 1990 [JP] Japan .................. 2-254731

[51] Int. Cl.⁵ .............................. B60T 8/40
[52] U.S. Cl. ..................... 303/113 AP; 188/349; 303/9.75; 303/9.63; 303/113 R; 303/115 PP
[58] Field of Search .............. 303/113 AP, 115 PP, 303/115 FM, 116 R, 116 SP, 100, 92, 9.62, 9.63, 9.75, 9.73, 9.74, 9.72, 9.71, 115 R, 113 R; 188/349

[56] References Cited

U.S. PATENT DOCUMENTS

| | | | |
|---|---|---|---|
| 4,500,138 | 2/1985 | Mizusawa et al. | 188/349 X |
| 4,627,670 | 12/1986 | Matsuda et al. | 303/115 PP |
| 4,641,893 | 2/1987 | Sato et al. | 303/115 PP |
| 4,690,464 | 9/1987 | Matsuda et al. | 303/115 PP |
| 4,714,296 | 12/1987 | Imoto et al. | 303/9.62 |
| 4,721,343 | 1/1988 | Matsuda et al. | 303/9.62 |
| 4,750,329 | 6/1988 | Horiuchi et al. | 303/9.62 X |
| 4,929,036 | 5/1990 | Iwagawa et al. | 303/92 X |
| 5,100,211 | 3/1992 | Sugimoto et al. | 303/115 PP |

FOREIGN PATENT DOCUMENTS

| | | |
|---|---|---|
| 0209278 | 1/1987 | European Pat. Off. . |
| 60-107435 | 6/1985 | Japan . |
| 60-222354 | 11/1985 | Japan . |
| 3-70563 | 7/1991 | Japan . |
| 2238837 | 6/1991 | United Kingdom .......... 303/116 SP |

Primary Examiner—Douglas C. Butler
Attorney, Agent, or Firm—Armstrong & Kubovcik

[57] ABSTRACT

In a hydraulic braking pressure control system for a rear wheel brake wherein a control piston normally works to provide a hydraulic braking pressure control by cooperation with a cut-off valve interposed between an input chamber leading to a master cylinder and an output chamber leading to a wheel cylinder of the brake, the cut-off valve has a valve seat piston whose pressure-receiving area facing the output chamber is larger than the pressure-receiving area facing the output chamber. This ensures that opening and closing of the cut-off valve can be repeated in accordance with the output pressure from the master cylinder, so that the output pressure from the master cylinder can be reduced and applied to the brake wheel cylinder. When the control hydraulic pressure is lost, the control piston and sleeve can be moved in a direction to increase the volume of the output chamber thereby to close the lock valve and tightly close a control chamber between the control piston and sleeve, while restraining by a stopper the movement of the cut-off valve following in a closing direction of the control piston and sleeve. This makes it possible to insure a hydraulic braking pressure applied to the brake wheel cylinder.

3 Claims, 7 Drawing Sheets

HYDRAULIC BRAKING PRESSURE CONTROL SYSTEM FOR REAR WHEEL BRAKE

BACKGROUND OF THE INVENTION

1. Field of the Invention

The field of the present invention is hydraulic braking pressure control systems for rear wheel brake, of a type comprising an output chamber defined in a housing to lead to a rear wheel brake cylinder, a control chamber defined in the housing and capable of being connected to a control hydraulic pressure source and a reservoir through a switchover valve means capable of switching the communication and interruption, a control piston being provided to have opposite end faces thereof facing the output chamber and the control chamber, respectively, a partition wall provided in the housing for partitioning the output chamber and an input chamber which is defined in the housing to lead to a master cylinder, and a cut-off valve interposed between the input and output chambers and adapted to be closed in response to movement of the control piston toward the control chamber.

2. Description of the Prior Art

Such a hydraulic braking pressure control system is conventionally known, for example, from Japanese Patent Application Laid-open No. 222354/85.

In such a hydraulic braking pressure control system, it is necessary to previously cope with a case in which a defect or fall may occur in control hydraulic pressure from the control hydraulic pressure source for any reason. In the above prior art, when such a defect in control hydraulic pressure occurs, the cut-off valve is operated to open, permitting a hydraulic braking pressure from the master cylinder to be applied to the brake device.

However, since the control piston is permitted to move in a direction to reduce the volume of the control chamber, in other words, in a direction to increase the volume of the output chamber when the control hydraulic pressure source is in trouble, it is difficult to increase the hydraulic braking pressure applied to the brake cylinder. In view of this, a hydraulic braking pressure control system has been proposed in Japanese Patent Application Laid-open No. 107435/85, in which the control chamber is brought into a tightly closed state when a defect in control hydraulic pressure happens. In this system, however, when the control hydraulic pressure is lost, the cut-off valve is permitted to be closed and a passage bypassing the cut-off valve is opened so as to connect the input and output chambers. The system requires such a passage and means for opening and closing the passage in addition to the cut-off valve, resulting in a complicated construction.

Thereupon, the present assignee has already proposed a hydraulic braking pressure control system as shown in Japanese Utility Model Application No. 132318/89, which has a simple construction to open the cut-off valve and to close the control chamber tightly when the control hydraulic pressure is lost.

In a brake device for a passenger vehicle, it is usual to reduce the braking pressure for a rear wheel, as compared with the braking pressure for a front wheel, in order to enhance the braking effect. For providing such a reduction in the braking pressure for a rear wheel, a proportional pressure-reducing valve is interposed between the hydraulic braking pressure control system and a rear brake wheel cylinder. If it is possible to provide the hydraulic braking pressure control system with the function of the proportional pressure-reducing valve, the valve will be unnecessary, and this will contribute to a reduction in number of parts.

SUMMARY OF THE INVENTION

Accordingly, it is an object of the present invention to provide a hydraulic braking pressure control system for a rear wheel brake, of a simple construction to open the cut-off valve and to close the control chamber tightly when the control hydraulic pressure is lost, wherein the cut-off valve is provided even with a proportional pressure reducing function so as to omit a proportional pressure-reducing valve.

To achieve the above object, according to the present invention, there is provided a hydraulic braking pressure control system for a rear wheel brake, comprising an output chamber defined in a housing to lead to a rear brake wheel cylinder; a control chamber defined in the housing and capable of being connected to a control hydraulic pressure source and a reservoir through a switchover valve means capable of switching communication and interruption, a control piston being provided to have opposite end faces thereof facing the output chamber and the control chamber, respectively; a partition wall provided in the housing for partitioning the output chamber and an input chamber which is defined in the housing to lead to a master cylinder; and a cut-off valve interposed between the input and output chambers and adapted to be closed in response to movement of the control piston toward the control chamber, wherein the system further includes: a sleeve slidably received in the housing with a back of the sleeve facing a pilot chamber leading to the control hydraulic pressure source and with a front end of the sleeve facing the output chamber, the control piston being slidably received in the sleeve and having a front end facing the output chamber and a rear end facing the control chamber defined between the control piston and the sleeve; and a lock valve interposed between the control chamber and the switchover valve means and adapted to be closed in response to movement of the sleeve in a direction to reduce a volume of the pilot chamber; wherein the cut-off valve includes: a valve seat piston formed into a stepped cylinder shape with a pressure-receiving area thereof facing the input chamber being smaller than a pressure-receiving area thereof facing the output chamber, the valve seat piston being slidably received in the partition wall such that an end of the valve seat piston closer to the output chamber can be operatively connected to the front end of the sleeve, the valve seat piston having a valve seat at an end closer to the input chamber; a spring interposed between the housing and the valve seat piston to provide an operative connection of the valve seat piston with the front end of the sleeve; a valve member disposed in the input chamber and biased by a further spring in a direction to seat on the valve seat; a rod for transmitting an operation of the control piston to the valve member; and a stopper fixedly disposed in the housing to restrict the maximum amount of movement of the valve member in the seating direction to a position at which the valve member is moved away from the valve seat upon the maximum movement of the valve seat piston permitted in response to the movement of the sleeve toward the pilot chamber.

With the above construction, when the control hydraulic pressure from the control hydraulic pressure source is normal, the sleeve is in a position moved to the maximum toward the output chamber by a hydraulic pressure in the pilot chamber leading to the control hydraulic pressure source. In this condition, the cut-off valve is opened and closed by the control hydraulic pressure applied to the control chamber and therefore, the hydraulic braking pressure to be applied to the rear wheel brake wheel cylinder can be controlled by controlling the operation of the switchover valve means in a condition where a hydraulic braking pressure is being delivered from the master cylinder. Moreover, because the pressure-receiving area of the valve seat piston facing the output chamber is larger than the pressure-receiving area thereof facing the input chamber when the cut-off valve is open, the valve seat piston is movable axially in accordance with the output pressure from the master cylinder, thereby opening and closing the cut-off valve. Therefore, the hydraulic pressure in the input chamber is reduced at a given proportion and applied to the output chamber. This ensures that the output pressure from the master cylinder can be reduced and applied to the rear wheel brake wheel cylinder. Thus, the need for a proportional pressure-reducing valve can be eliminated, which contributes to a reduction in number of parts.

When a defect occurs in control hydraulic pressure from the control hydraulic pressure source, the sleeve and the control piston are moved in a direction to increase the volume of the output chamber in response to application of the hydraulic braking pressure from the master cylinder to the output chamber, and the valve seat piston and the valve member are moved by the hydraulic pressure in the input chamber. Thus, the lock valve is closed, and in the cut-off valve, even after the movement of the valve member has been restrained by the stopper, the valve seat piston is moved in a manner to follow the sleeve, thereby bringing the cut-off valve into an opened state. In this case, a braking force in the rear wheel brake wheel cylinder can be insured.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 3 illustrate a first embodiment of the present invention, wherein

FIGS. 4 to 7 illustrate a second embodiment of the present invention, wherein

DESCRIPTION OF THE PREFERRED EMBODIMENTS

The present invention will now be described by way of a first embodiment in connection with FIGS. 1 to 3.

Figure 1:
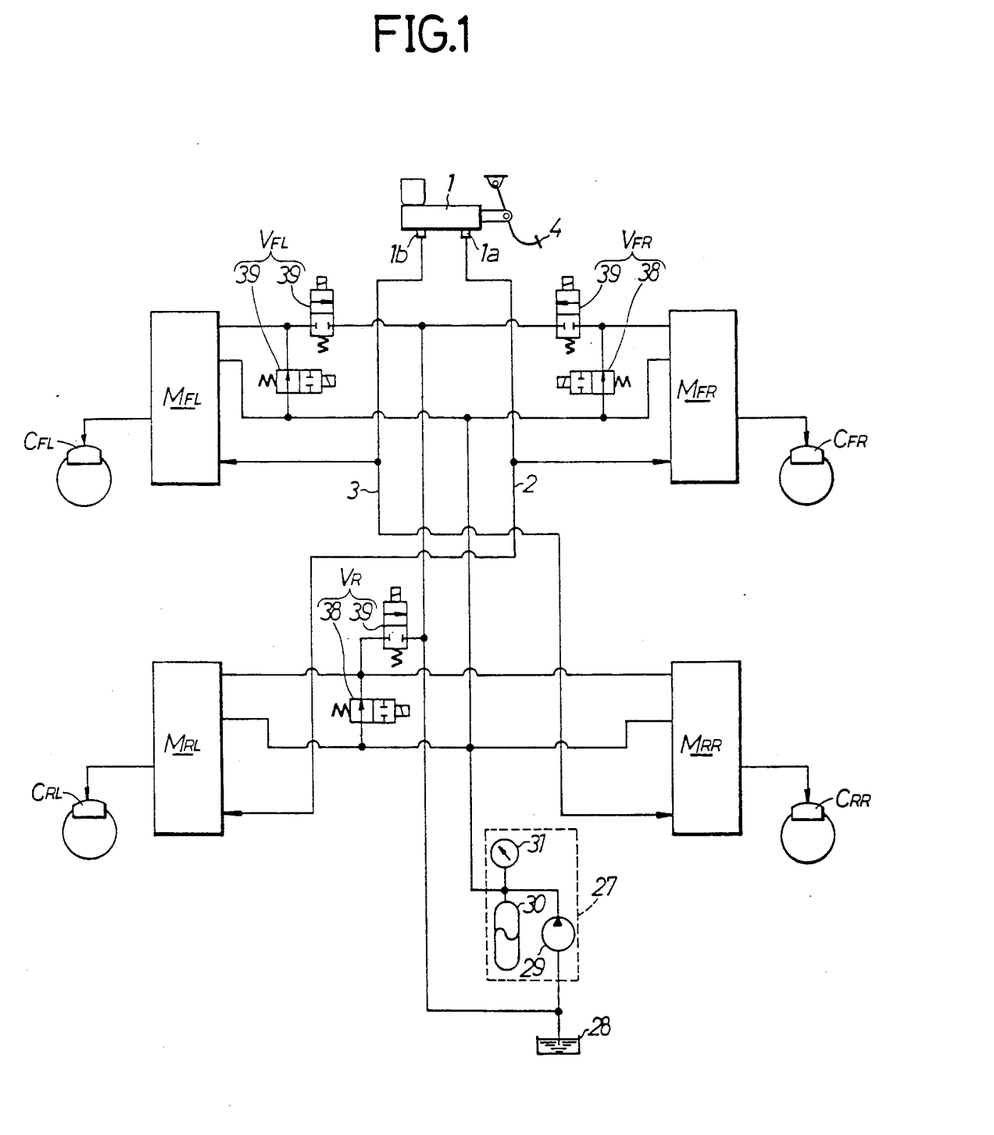
FIG. 1 is a diagram of a hydraulic braking pressure circuit for a vehicle.

Referring first to FIG. 1, brake cylinders $C_{FL}$, $C_{FR}$, $C_{RL}$ and $C_{RR}$ are mounted on front and rear, left and right wheels of a vehicle for exhibiting a braking force, respectively. A hydraulic braking pressure output passage 2 is connected to one output port 1a in a tandem type master cylinder 1, while a hydraulic braking pressure output passage 3 is connected to another output port 1b. A hydraulic braking pressure control system $M_{FR}$ for a right front wheel brake and a hydraulic braking pressure control system $M_{RL}$ for a left rear wheel brake are interposed between the hydraulic braking pressure output passage 2 and the right front brake cylinder $C_{FR}$ and the left rear brake cylinder $C_{RL}$, respectively. A hydraulic braking pressure control system $M_{FL}$ for a left front wheel brake and a hydraulic braking pressure control system $M_{RR}$ for right rear wheel brake are interposed between the hydraulic braking pressure output passage 3 and the left front brake wheel cylinder $C_{FL}$ and the right rear brake cylinder $C_{RR}$, respectively.

The left and right front wheel brake hydraulic braking pressure control systems $M_{FL}$ and $M_{FR}$ are capable of transmitting a hydraulic braking pressure delivered from the output ports 1a and 1b of the master cylinder 1 in response to depression of a brake pedal 4 to the left and right front brake cylinders $C_{FL}$ and $C_{FR}$ during a normal braking, and are capable of controlling the hydraulic braking pressure applied to the brake cylinders $C_{FL}$, $C_{FR}$ in response to the operation of switchover valve means $V_{FL}$ and $V_{FR}$ which are provided in correspondence to the left and right front wheel brake hydraulic braking pressure control systems $M_{FL}$ and $M_{FR}$, respectively, during an anti-lock control. The left and right rear brake hydraulic braking pressure control systems $M_{RL}$ and $M_{RR}$ are capable of reducing and transmitting a hydraulic braking pressure delivered from the output ports 1a and 1b of the master cylinder 1 in response to depression of the brake pedal 4 to the left and right rear brake cylinders $C_{RL}$ and $C_{RR}$ during the normal braking, and are capable of controlling the hydraulic braking pressure applied to the brake cylinders $C_{RL}$ and $C_{RR}$ in response to the operation of a switchover valve mean $V_R$ common to the hydraulic braking pressure control systems $M_{RL}$ and $M_{RR}$ during the anti-lock control.

Figure 2:
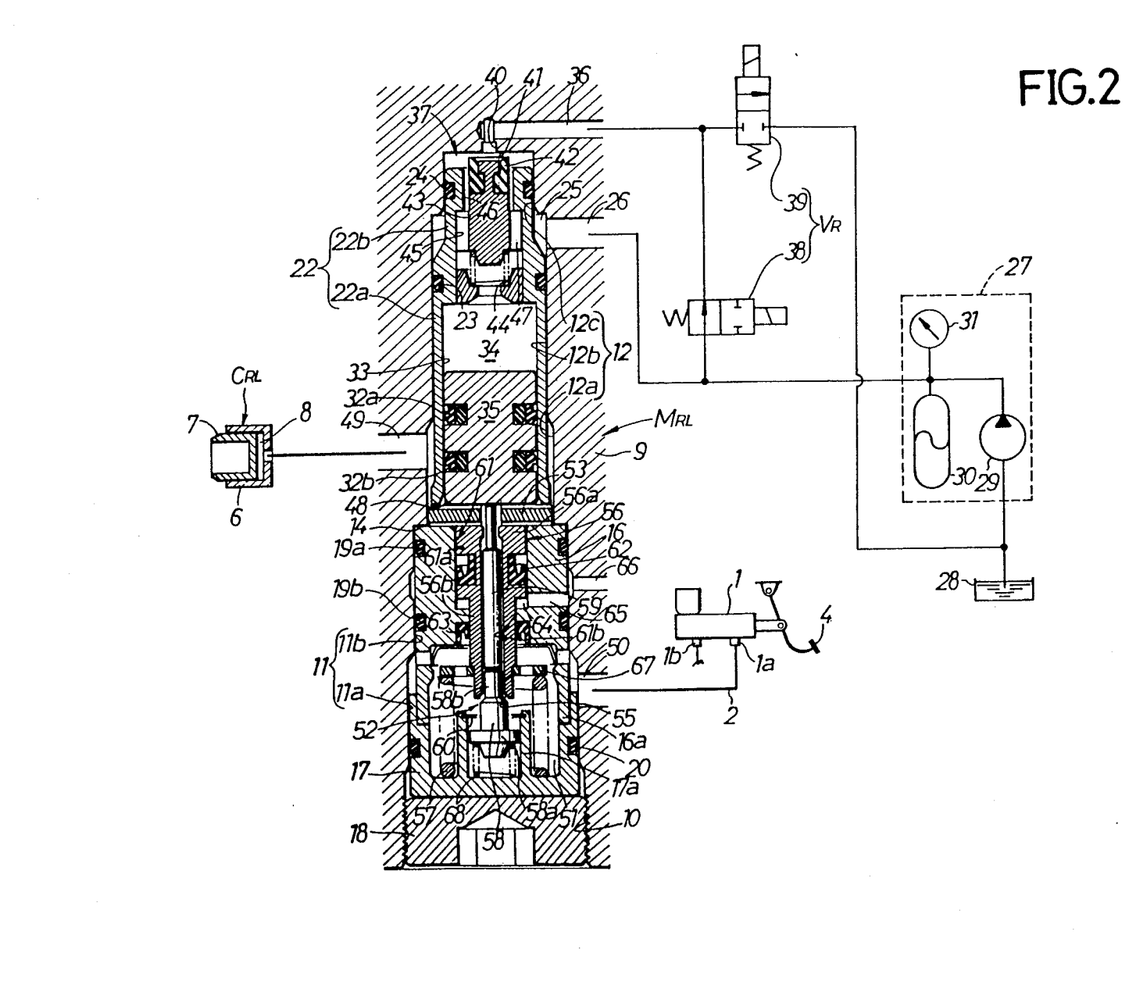
FIG. 2 is a longitudinal sectional view of a hydraulic braking pressure control system for a rear wheel brake.

Referring also to FIG. 2, the left rear brake cylinder $C_{RL}$ comprises a cylinder body 6, and a braking piston 7 slidably received in the cylinder body 6. A braking force is generated by a hydraulic braking pressure applied to a hydraulic braking pressure chamber 8 defined between the cylinder body 6 and the piston 7. The other brake cylinders $C_{FL}$, $C_{FR}$ and $C_{RR}$ also have basically the same construction as the left rear brake cylinder $C_{RL}$.

The left rear brake hydraulic braking pressure control system $M_{RL}$ has a housing 9 which is coaxially provided, in sequence from one end (referred to as a lower end in FIG. 2 hereinafter), with a threaded bore 10, a mounting bore 11 connected to the threaded bore 10, and a slide bore 12. The mounting bore 11 is comprised of a first bore portion 11a having a diameter smaller than that of the threaded bore 10 and connected at the lower end to the threaded bore 10, and a second bore portion 11b having a diameter smaller than that of the first bore portion 11a and connected at the lower end to the first bore portion 11a. The slide bore 12 is comprised of a larger diameter bore portion 12a connected to the mounting bore 11 with a step 14 facing the lower end side, a mean diameter bore portion 12b having a diameter smaller than that of the larger diameter bore portion 12a, and a smaller diameter bottomed bore portion 12c having a diameter smaller than that of the mean diameter bore portion 12b. The bore portions 12a, 12b and 12c are connected to one another from the lower end side.

A cylindrical member is fitted into the second bore portion 11b of the mounting bore 11 to provide a partition wall 16, and a bottomed cylindrical support member 17 is fitted into the first bore portion 11a with its closed end facing the lower end side. Further, a plug 18 is screwed into the threaded bore 10. Moreover, the partition wall 16 is integrally provided with a cylindrical fitting portion 16a which projects toward the lower end and is fitted into the support member 17. The upper end of the partition wall 16 abuts against the step 14, and by screwing the plug 18 into the threaded bore 10 until it abuts against the support member 17, the partition wall 16 and the support member 17 are clamped between the step 14 and the plug 18 and fixed in a fitted manner in the mounting bore 11. Further, a pair of O-rings 19a and 19b are fitted, spaced apart from each other, over an outer surface of the partition wall 16 in contact with an inner surface of the second bore portion 11b, and an O-ring 20 is fitted over an outer surface of the support member 17 in contact with an inner surface of the first bore portion 11a.

A sleeve 22 is slidably received in the slide bore 12 and comprised of a larger diameter portion 22a corresponding to the mean diameter bore portion 12b, and a smaller diameter portion 22b corresponding to the smaller diameter bore portion 12c. The portions 22a and 22b are coaxially connected to each other. An O-ring 23 is fitted over an outer surface of the larger diameter portion 22a in sliding contact with an inner surface of the mean diameter bore portion 12a, while an O-ring 24 is fitted over an outer surface of the smaller diameter portion 22b in sliding contact with an inner surface of the smaller diameter bore portion 12c. An annular pilot chamber 25, to which a back of the sleeve 22 faces, is defined between an outer surface of the sleeve 22 and an inner surface of a connection between the mean diameter bore portion 12b and the smaller diameter bore portion 12c in the slide bore 12. The pilot chamber 25 is connected to a control hydraulic pressure source 27 through a pilot port 26 provided in the housing 9.

The control hydraulic pressure source 27 comprises a hydraulic pump 29 for pumping control liquid from a reservoir 28, an accumulator 30 connected to the hydraulic pump 29, and a pressure switch 31 for controlling the operation of the hydraulic pump 29, so that a constant control hydraulic pressure higher than a hydraulic braking pressure delivered from the master cylinder 1 can be supplied from the control hydraulic pressure source 27.

The sleeve 22 is provided with a cylinder bore 33 opened at the lower end face of the larger diameter portion 22a of the sleeve 22, and a control piston 35 is slidably received in the cylinder bore 33 to define a control chamber 34 between the control piston 35 itself and the sleeve 22. Moreover, a pair of sealing members 32a and 32b are fitted at a distance over an outer surface of the control piston 35 in sliding contact with an inner surface of the cylinder bore 33. A lock valve 37 is interposed between the control chamber 34 and a control port 36 provided in the housing 9. The switchover valve means $V_R$ is interposed between the control port 36 and the control hydraulic pressure source 27 as well as the reservoir 28.

The switchover valve means $V_R$ is comprised of a normally opened solenoid valve 38 interposed between the control port 36 and the control hydraulic pressure source 27, and a normally closed solenoid valve 39 interposed between the control port 36 and the reservoir 28, so that it can be switched over among a state in which the control port 36 is put into communication with the control hydraulic pressure source 27, a state in which the control port 36 is put into communication with the reservoir 28 and a state in which the control port 36 is put out of communication with the control hydraulic pressure source 27 and the reservoir 28, by switching-over the energization and deenergization of the solenoid valves 38 and 39.

The lock valve 37 comprises a valve bore 40 provided in the housing 9 in communication with the control port 36 and bored at the upper end wall of the slide bore 12 coaxially with the slide bore 12, a valve seat 41 formed on the housing 9 to surround the end of the valve bore 40 open to the slide bore 12, a valve member 43 having at its leading end a rubber valve element 42 capable of seating on the valve seat 41, and a valve spring 44 for biasing the valve member 43 in a direction to seat on the valve seat 41. The sleeve 22 is coaxially provided at its rear end with a support bore 45 leading to the control chamber 34. A radially inwardly projecting flange 46 is provided at the end of the support bore 45 which is open to the valve seat 41. The valve member 43 is disposed in the support bore 45 to extend through the flange 46. Receiving collars 47 are projectingly provided on a side of the valve member 43 at a plurality of locations circumferentially spaced apart from one another for abutment against the flange 46, and a valve spring 44 is mounted in a compressed manner between the receiving collars 47 and the sleeve 22.

In such lock valve 37, in a condition in which a normal control hydraulic pressure has been applied from the control hydraulic pressure source 27 to the pilot chamber 25 to move the sleeve 22 to a position shown in FIG. 2, the valve member 43 with the receiving collars 47 abutting against the flange 46 is in a position in which the valve element 42 is spaced apart from the valve seat 41, and when the sleeve 22 is moved in a direction to reduce the volume of the pilot chamber 25 in response to a reduction in control hydraulic pressure in the pilot chamber 25, the valve element 42 seats on the valve seat 41.

An output chamber 48 is defined between the partition wall 16 fixedly disposed in the mounting bore 11 in the housing 9 and the lower end face of the larger diameter portion 22a of the sleeve 22 as well as of the control piston 35 to communicate with the hydraulic braking pressure chamber 8 in the left rear brake wheel cylinder $C_{RL}$ through an output port 49 provided in the housing 9. An input chamber 51 is defined between the partition wall 16 and the support member 17 to communicate with the output port 1a in the master cylinder 1 through an input port 50 provided in the housing 9, and a cut-off valve 52 is interposed between the input chamber 51 and the output chamber 48. A disk member 53 is axially movably disposed in the output chamber 48 between the sleeve 22 as well as the control piston 35 and the partition wall 16.

The cut-off valve 52 comprises a valve seat piston 56 basically formed into a stepped cylinder shape and slidably received in the partition wall 16 to have a valve seat 55 at an end closer to the input chamber 51, a spring 57 for exhibiting a spring force for biasing the valve seat piston 56 toward the output chamber 48, a valve member 58 disposed in the input chamber 51 and biased in a direction to seat on the valve seat 55, a rod 59 loosely inserted through the valve seat piston 56 to transmit the operation of the control piston 35 to the valve member 58, and a stopper 60 for restricting the maximum amount of movement of the valve member 58 in the direction to seat the valve seat 55. It should be noted that the rod 59 may be either integral with or separate from the valve member 58.

A guide bore 61 is provided at a central portion of the partition wall 16 coaxially with the control piston 35 to extend between the output chamber 48 and the input chamber 51 and is comprised of a larger diameter bore portion 61a closer to the output chamber 48 and a smaller diameter bore portion 61b closer to the input chamber 51. The bore portions 61a and 61b are coaxially connected to each other. The valve seat piston 56 is comprised of a larger diameter portion 56a slidably received in the larger diameter bore portion 61a, and a smaller diameter portion 56b slidably received in the smaller diameter bore portion 61b. The portions 56a and 56b are coaxially connected to each other. A sealing member 62 is fitted over an outer surface of the larger diameter portion 56a in sliding contact with an inner surface of the larger diameter bore portion 61a, while a sealing member 63 is fitted to an inner surface of the smaller diameter bore portion 61b in sliding contact with an outer surface of the smaller diameter portion 56b. In this way, the pressure receiving area of the valve seat piston 56 which faces to the output chamber 48 is larger than a pressure receiving area facing the input chamber 51.

An annular chamber 64 is defined between a step between the larger and smaller diameter bore portions 61a and 61b of the guide bore 61 and a step between the larger and smaller diameter portions 56a and 56b of the valve seat piston 56 to communicate with the outside through a release bore 66 provided in the housing 9, thereby avoiding a variation in pressure in the annular chamber 64 in response with the axial movement of the valve seat piston 56.

A radially outwardly projecting collar 67 is provided on the valve seat piston 56 at the end closer to the input chamber 51, and a spring 57 is mounted in a compressed manner between this collar 67 and the support member 17. The valve seat piston 56 is biased toward the output chamber 48 by a spring force of the spring 57, so that the valve seat piston 56 abuts at its end closer to the output chamber 48 against the disk member 53. Thus, the valve seat piston 56 is connected to the sleeve 22 through the disk member 53.

The support member 17 is integrally provided at its closed end with a cylindrical portion 17a projecting toward the input chamber 51, and the ring-like stopper 60 is fixed to an inner surface of the tip end of the cylindrical portion 17a. The valve member 58 includes a restraining collar 58a capable of abutting against the stopper 60, and a drive bar 58b loosely inserted into the valve seat piston 56, and a valve spring 68 is mounted in a compressed manner between the restraining collar 58a and the support member 17.

A rod 59 is loosely inserted into the valve seat piston 56 to extend through the disk member 53, so that the upper end thereof abuts against the control piston 35. The lower end of the rod 59 abuts against the drive bar 58b of the valve member 58. The axial length of the rod 59 is set such that in a condition in which the rod 59 and the valve seat piston 56 abut against the control piston 35, the valve member 58 abutting against the rod 59 is spaced apart from the valve seat 55 to open the cut-off valve 52.

The construction of the right rear wheel brake hydraulic braking pressure control system $M_{RR}$ is basically the same as the above-described left rear wheel brake hydraulic braking pressure control system $M_{RL}$.

The construction of the right front wheel brake hydraulic braking pressure control system $M_{FR}$ will now be described with reference to FIG. 3. Excluding a portion thereof, the right front wheel brake hydraulic braking pressure control system $M_{FR}$ has basically the same construction as the left and right rear wheel brake hydraulic braking pressure control systems $M_{RL}$ and $M_{RR}$ and hence, only the portion having a different construction will be described, while a main section having basically the same construction will be merely shown with components thereof designated by the same reference characters as the left rear wheel brake hydraulic braking pressure control system $M_{RL}$ in FIG. 2.

In the right front wheel brake hydraulic braking pressure control system $M_{FR}$, a guide bore 61' having the same inside diameter over the axially entire length is provided in a partition wall 16' provided in the housing 9 to partition the output chamber 48 and the input chamber 51. A valve seat piston 56' which is a component of a cut-off valve 52' interposed between the output chamber 48 and the input chamber 51 is formed into a cylindrical shape having the same outside diameter over the axially entire length, so that it may be slidably received in the guide bore 61'.

The left front wheel brake hydraulic braking pressure control system $M_{FL}$ has basically the same construction as the right front wheel brake hydraulic braking pressure control system $M_{FR}$.

The operation of the first embodiment will be described below. During a normal braking in which the control hydraulic pressure source 27 is normally operative, the normally opened solenoid valves 38 and the normally closed solenoid valves 39 in the switchover valve means $V_{FL}$, $V_{FR}$ and $V_R$ have been deenergized. Therefore, the control hydraulic pressure from the control hydraulic pressure source 27 has been applied to the pilot chamber 25 in each of the hydraulic braking pressure control systems $M_{FL}$, $M_{FR}$, $M_{RL}$ and $M_{RR}$ to move the sleeve 22 to the maximum toward the output chamber 48, and the lock valve 37 is in its opened state. Accordingly, the control hydraulic braking pressure from the control hydraulic pressure source 27 has been also applied to the control chamber 34 to move the control piston 35 to the maximum toward the output chamber 48. In this condition, the disk member 53 is in a state in which it has been clamped between the sleeve 22 and the partition wall 16.

Therefore, in each of the left and right front wheel brake hydraulic braking pressure control systems $M_{FL}$ and $M_{FR}$, the valve member 58 of the cut-off valve 52' is in a valve-opening position in which the valve member 58 is away from the valve seat 55 with the drive bar 58b urged by the control piston 35 through the rod 59. If the brake pedal 4 is depressed to effect a braking in such condition, the hydraulic braking pressure delivered from the output ports 1a and 1b in the master cylinder 1 passes through the input port 50, the input chamber 51, the cut-off valve 52', the output chamber 48 and the output port 49 and applied to each of the left and right front wheel brake cylinders $C_{FL}$ and $C_{FR}$.

On the other hand, in each of the left and right rear wheel brake hydraulic braking pressure control systems $M_{RL}$ and $M_{RR}$, in an initial condition in which the hydraulic braking pressure delivered from the output ports 1a and 1b in the master cylinder 1 is applied to the input chamber 51 with the control piston 35 moved to the maximum toward the output chamber 48, the valve member 58 has been urged away from the valve seat 55 by the control piston 35 through the rod 59, and the drive bar 58 and the cut-off valve 52 is in its opened state. Accordingly, the hydraulic braking pressure from the output ports 1a and 1b is applied to the input chamber 51 and then passes through the cut-off valve 52, the output chamber 48 and the output port 49 and applied to the each of the left and right rear wheel brake cylinders $C_{RL}$ and $C_{RR}$.

However, because in the valve seat piston 56 of the cut-off valve 52 the pressure receiving area of the valve seat facing the output chamber 48 is set larger than the pressure receiving area facing the input chamber 51, when the pressures in the input chamber 51 and the output chamber 48 are the same as each other, a hydraulic pressure effects a force for biasing the valve seat piston 56 toward the input chamber 51. When the hydraulic pressure for biasing the valve seat piston 56 toward the input chamber 51 overcomes the spring force of the spring 57, the valve seat piston 56 is caused to move toward the input chamber 51, so that the valve member 58 seats on the valve seat 55 to close the cut-off valve 52. When the hydraulic pressure in the input chamber 51 is increased with the cut-off valve 52 in the closed state, the valve seat piston 56 moves toward the output chamber 48 to open the cut-off valve 52. By such opening and closing operation of the cut-off valve 52 by the axial reciprocal movement of the valve seat piston 56, the hydraulic pressure applied to the input chamber 51 is reduced at a given proportion and applied to the output chamber 48. Therefore, the hydraulic braking pressure delivered from the output ports 1a and 1b is reduced at a given proportion in each of the left and right rear wheel brake hydraulic braking pressure control systems $M_{RL}$ and $M_{RR}$ and applied to each of the left and right rear wheel brake wheel cylinders $C_{RL}$ and $C_{RR}$. This eliminates the need for a proportional pressure-reducing valve conventionally required.

When the braking force is to be reduced in response to a wheel being about to become locked during such a braking, e.g., when the braking force for the left and right rear wheels $W_{RL}$ and $W_{RR}$ is to be reduced, the normally-opened and normally-closed solenoids 38 and 39 of the switchover valve $V_R$ are energized. This causes the control chambers 34 in the left and right rear wheel brake hydraulic braking pressure control systems $M_{RL}$ and $M_{RR}$ to be put into communication with the reservoir 28, so that the control chambers 34 are reduced in pressure. Thus, the control piston 35 is urged by the hydraulic pressure in the output chamber 48 in the direction to increase the volume of the output chamber 48. In this case, the valve member 58 and the rod 59 biased by the spring 68 are also moved in a manner to follow the movement of the control piston 35, so that the valve member 58 seats on the valve seat 55 to close the cut-off valve 52. This increases the volume of the output chamber 48 to reduce the hydraulic braking pressure in each of the left and right rear wheel brake cylinders $C_{RL}$ and $C_{RR}$.

When the braking force is to be maintained, with the normally-opened solenoid valve 38 energized, the normally-closed solenoid valve 39 may be deenergized to cut-off the communication of the control chamber 34 with the reservoir 28, so that the position of the control piston 35 may be maintained at a given position.

Further, when the braking force is to be increased again, both of the normally-opened and normally-closed solenoid valves 38 and 39 may be deenergized, thereby allowing the control hydraulic pressure from the control hydraulic pressure source 27 to be applied to the control chamber 34. Then, the control piston 35 is moved again in the direction to reduce the volume of the output chamber 48, so that the rod 59 is urged by the control piston 35, and the valve member 58 is urged by the rod 59, thereby opening the cut-off valve 52. This causes the input chamber 51 to be put into communication with the output chamber 48.

Figure 3:
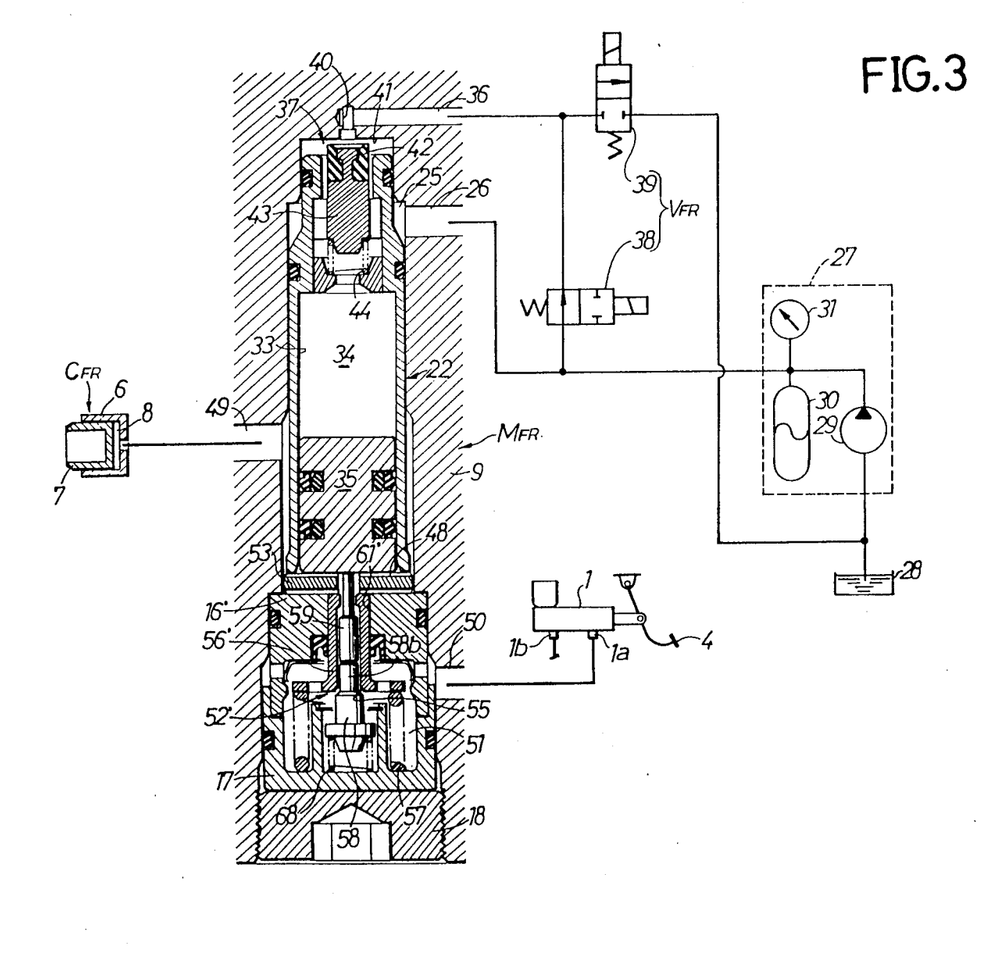
FIG. 3 is a longitudinal sectional view of a hydraulic braking pressure control system for a front wheel brake.

When the control hydraulic pressure source 27 falls into malfunction to produce a defect in control hydraulic pressure, the valve seat piston 56, 56' in each of the hydraulic braking pressure control systems $M_{FL}$, $M_{FR}$, $M_{RL}$ and $M_{RR}$ is moved, by the spring force of the spring 57, upwardly as viewed in FIGS. 2 and 3, i.e., in a direction to urge the disk member 53 and the sleeve 22 as well as the control piston 35 to reduce the volume of the pilot chamber 25. In this case, in the cut-off valve 52, 52', the valve member 58 is biased by the action of the valve spring 68, but the movement of the valve member 58 is restrained by the stopper 60 and spaced apart from the valve seat 55 to open the cut-off valve 52, 52'. For this reason, when the hydraulic braking pressure delivered from the output ports 1a and 1b in the master cylinder 1 is applied to the input chamber 51 in response to braking, such hydraulic braking pressure is applied to the output chamber 48, so that the hydraulic braking pressure can be applied to each of the brake cylinders $C_{FL}$, $C_{FR}$, $C_{RL}$ and $C_{RR}$ through the output port 49.

Moreover, the lock valve 37 is closed by the movement of the sleeve 22 in the direction to reduce the volume of the pilot chamber 25, avoiding the release of the hydraulic pressure from the control chamber 34 more than necessary. This ensures that the volume of the output chamber 48 cannot be increased more than necessary, and it is possible to easily insure a braking force in each of the wheel cylinders $C_{FL}$, $C_{FR}$, $C_{RL}$ and $C_{RR}$.

When a defect in control hydraulic pressure is produced in the middle of braking, the sleeve 22 and the control piston 35 are urged by the hydraulic pressure in the output chamber 48. This causes the lock valve 37 to be closed, and in the cut-off valve 52, 52', the valve member 58 biased by the valve spring 68 seats on the valve seat 55 to urge the valve seat piston 56. However, the amount of movement of the valve member 58 is likewise restrained by the stopper 60, whereas the valve piston 56, 56' can be further moved and therefore, the cut-off valve 52, 52' can be brought into its opened state, thereby insuring a braking force continuously.

Further, even when a defect in control hydraulic pressure is produced in the middle of an anti-lock control for the front and rear wheels, an operation similar to that described above is conducted. However, since in the valve seat piston 56 of the cut-off valve 52, the pressure-receiving area facing the output chamber 48 in each of the rear brake hydraulic braking pressure control systems $M_{RR}$ and $M_{RL}$ is larger than that in each of the front brake hydraulic braking pressure control systems $M_{FR}$ and $M_{FL}$, the beginning of movement of the sleeve 22 and the control piston 35 in each of the rear wheel brake hydraulic braking pressure control systems $M_{RR}$ and $M_{FL}$ is delayed relative to that in each of the front wheel brake hydraulic braking pressure control systems $M_{FR}$ and $M_{FL}$, and closing of the lock valve 37 and opening of the cut-off valve 52 in each of the rear brake hydraulic braking pressure control systems $M_{RR}$ and $M_{RL}$ are also delayed relative to those in each of the front brake hydraulic braking pressure control systems $M_{FR}$ and $M_{FL}$. Therefore, even if the front and rear wheels become locked again by application of the hydraulic braking pressure from the master cylinder 1, the time when the rear wheels become locked can be delayed relative to the time when the front wheels become locked. This makes it possible to insure a stability in direction of the vehicle.

A second embodiment of the present invention will now be described, wherein primary parts corresponding to those in the first embodiment are designated by the same reference numerals and characters.

Figure 4:
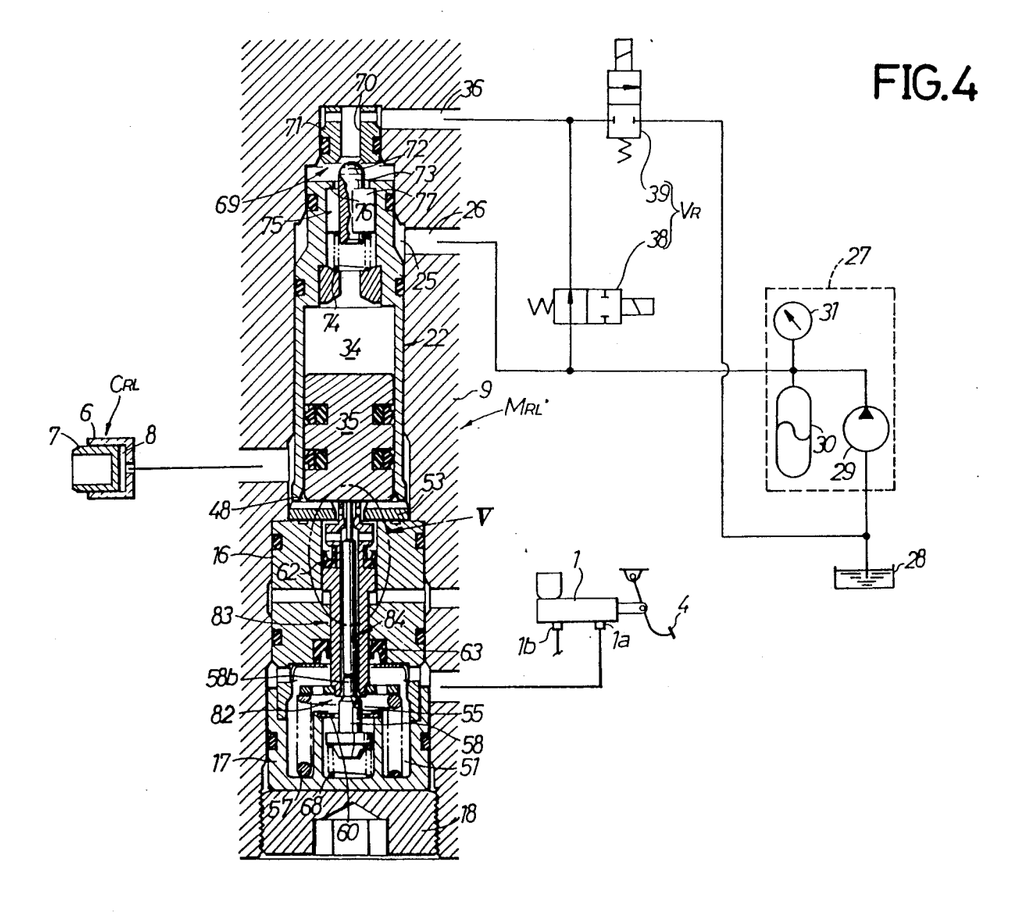
FIG. 4 is a longitudinal sectional view of a hydraulic braking pressure control system for a rear wheel brake.
Figure 5:
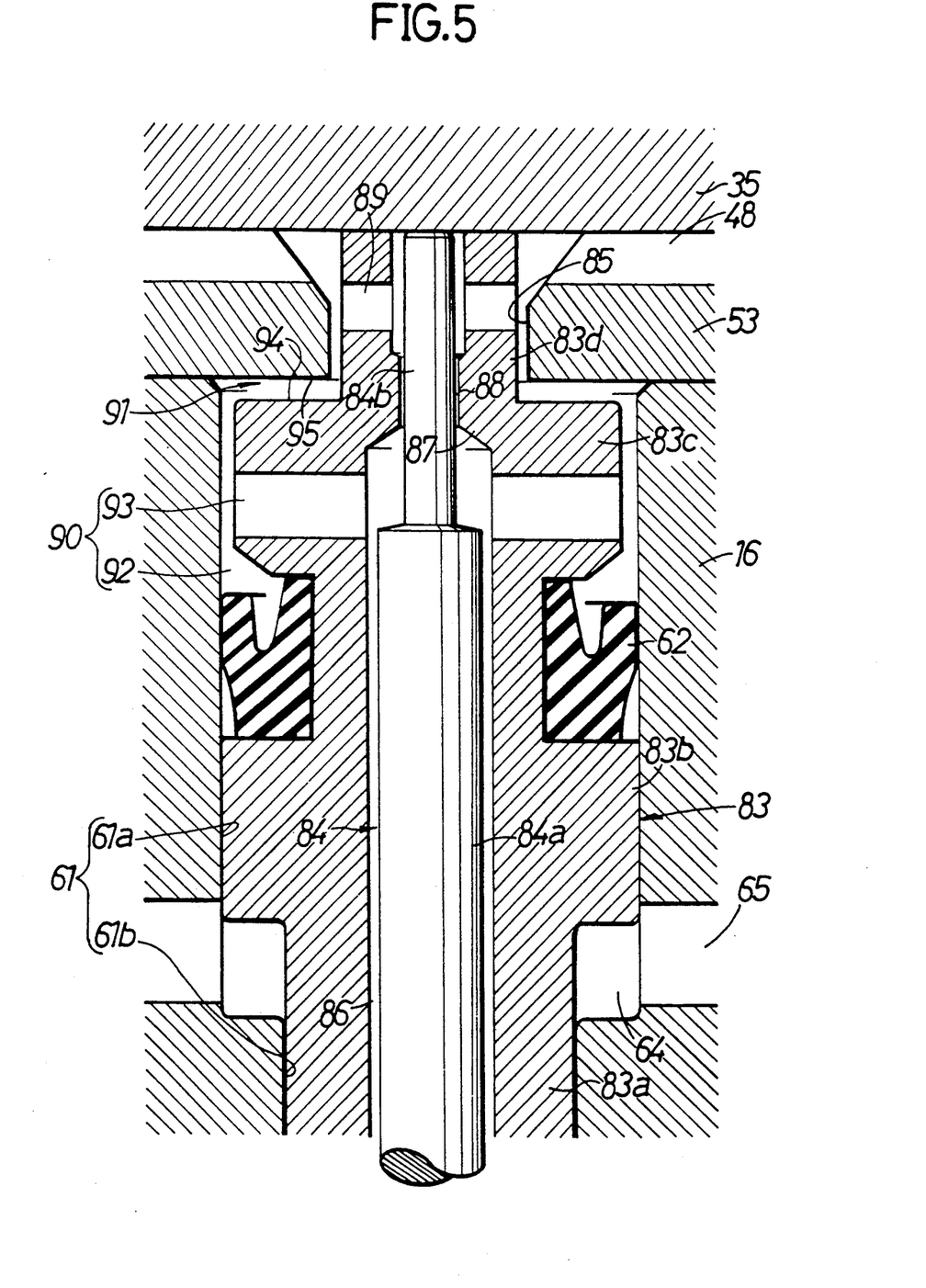
FIG. 5 is an enlarged view of a portion indicated by V in FIG. 4.

Referring first to FIGS. 4 and 5, a lock valve 69 is interposed between a control chamber 34 and a switch-over valve $V_R$ in a left rear wheel brake hydraulic braking pressure control system $M_{RL}$, and comprises a valve seat member 71 fitted in a housing 9 and having a valve bore 70 communicating with a control port 36, a valve member 73 capable of seating on a valve seat 72 provided on the valve seat member 71 at that opened end of the valve bore 70 which is closer to a sleeve 22, and a valve spring 74 for biasing the valve member 73 in a direction to seat on the valve seat 72. A radially inwardly projecting flange 76 is provided on the sleeve 22 at the end of a support bore 75 closer to the valve seat member 71. The valve member 73 is disposed in the support bore 75 to extend through the flange 76, and receiving collars 77 are projectingly provided on a side of the valve member 73 at a plurality of circumferentially spaced apart locations and capable of abutting against the flange 76. The valve spring 74 is mounted in a compressed manner between the receiving collars 77 and the sleeve 22.

In such lock valve 69, the valve member 73 seats on the valve seat 72 to close the lock valve as a result of movement of the sleeve 22 toward the valve seat member 71 in response to a reduction in control hydraulic pressure in the pilot chamber 25.

The cut-off valve 82 is interposed between an output chamber 48 and an input chamber 51 and comprises a valve seat piston 83 slidably received in a partition wall 16 and having a valve seat 55 at its end closer to input chamber 51, a spring 57 for exhibiting a spring force for biasing the valve seat piston 83 toward the output chamber 48, a valve member 58 disposed in the input chamber 51 and spring-biased in a direction to seat on the valve seat 55, a rod 84 inserted through the valve seat piston 83 to transmit the operation of a control piston 35 to the valve member 58, and a stopper 60 for restricting the amount of movement of the valve member 58 in the direction to seat the valve seat 55.

A through-hole 85 is provided in a central portion of a disk member 53 to lead to the output port 48 and has an inside diameter set smaller than that of a larger diameter bore portion 61a of a guide bore 61 in the partition wall 61. The valve seat piston 83 is comprised of a first cylindrical portion 83a slidably received in a smaller diameter bore portion 61b of the guide bore 61, a second cylindrical portion 83b having a diameter larger than that of the first cylindrical portion 83a and slidably received in the larger diameter bore portion 61a of the guide bore 61, a third cylindrical portion 83c having a diameter larger than that of the through hole 85 and smaller than that of the larger diameter bore portion 61a, and a fourth cylindrical portion 83d loosely passing through the through-hole 85. The portions 83a to 83d are coaxially connected to one another. A sealing member 62 is fitted over an outer surface of the second cylindrical portion 83b in sliding contact with an inner surface of the larger diameter bore portion 61a, and a sealing member 63 is fitted in the smaller diameter bore portion 61b at the end closer to the input chamber 51 in sliding contact with an outer surface of the first cylindrical portion 83a of the valve seat piston 83.

The above construction ensures that in the valve piston 83 the pressure-receiving area facing the output chamber 48 is set larger than the pressure-receiving area facing the input chamber 51.

The rod 84 inserted through the valve seat piston 83 between the control piston 35 and the valve member 58 is comprised of a larger diameter portion 84a and a smaller diameter portion 84b which are coaxially connected to each other in sequence from the side of the valve member 58. The larger diameter portion 84a defines an annular flow passage 86 between the larger diameter portion itself and an inner surface of the valve seat piston 83 together with a drive bar 58a of the valve member 58. The smaller diameter portion 84b movably passes through a collar 87 projectingly provided on the inner surface of the valve seat piston 83, and an annular orifice 88 is defined between an outer surface of the smaller diameter portion 84b and an inner surface of the collar 87. Further, a plurality of communication passages 89 are provided in a side wall of the fourth cylindrical portion 83d of the valve seat piston 83. Thus, when the cut-off valve 82 is open, the input chamber 51 communicates with the output chamber 48 through the annular flow passage 86, the orifice 88 and the communication passages 89.

A passage 90 is provided between the annular flow passage 86 and the output chamber 48 around the orifice 88, and an on-off valve 91 is mounted in the middle of the passage 90. More specifically, the axial length of the fourth cylindrical portion 83d of the valve seat piston 83 is set such that with the fourth cylindrical portion 83d in abutment against the control piston 35, a connection between the third cylindrical portion 83c and the fourth cylindrical portion 83d is in a position spaced apart from the disk member 53. In this condition, a flow passage 92 leading to the output chamber 48 is defined between the disk member 53 and the partition wall 16 and the valve seat piston 83. A communication passage 93 is also provided in the third cylindrical portion 83c of the valve seat piston 83 for permitting the annular flow passage 86 to communicate with the flow passage 92, and the passage 90 parallel to the orifice 88 is constituted by the flow passage 92 and the communication passage 93.

The on-off valve 91 is comprised of a valve member portion 94 formed at a step in the connection between the third and fourth cylindrical portions 83c and 83d of the valve seat piston 83, and a valve seat portion 95 formed on the disk member 53 in an opposed relation to the valve member portion 94 to surround the through-hole 85.

Figure 6:
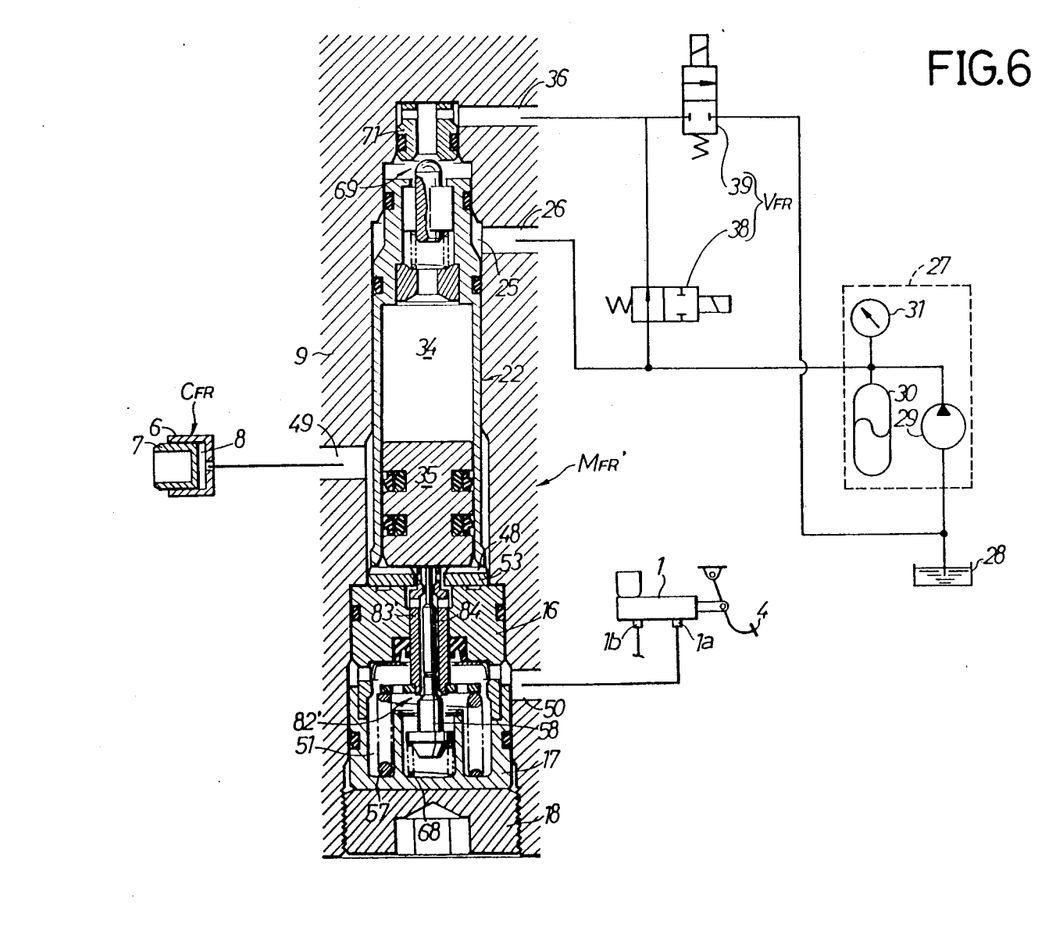
FIG. 6 is a longitudinal sectional view of a hydraulic braking pressure control system for a front wheel brake.

A right front wheel brake hydraulic braking pressure control system $M_{FR}'$ will now be described with reference to FIG. 6. In this right front wheel brake hydraulic braking pressure control system $M_{FR}'$, a valve seat piston 83' which is a component of a cut-off valve 82' interposed between an output chamber 48 and an input chamber 51 is basically cylindrically formed with a pressure-receiving area facing the output chamber 48 being equal to a pressure-receiving area facing the input chamber 51, and other arrangements are basically the same as those in the above-described left rear wheel brake hydraulic braking pressure control system $M_{RL}'$.

With the second embodiment, if, after the braking force is reduced in response to a wheel being about to become locked, a control hydraulic pressure from the control hydraulic pressure source 27 is applied to the control chamber 34 to increase the braking force again, the control piston 35 is then moved in a direction to reduce the volume of the output chamber 48. At the beginning of movement of the control piston 35 toward the disk member 53, the on-off valve 91 is in its closed state, i.e., the valve seat piston 83, 83' is in abutment against the disk member 53, and the cut-off valve 82, 82' is in its closed state, i.e., the rod 84 is in a state in which it projects to a location nearer to the output chamber 48 than to the valve seat piston 83, 83'. In response to the movement of the control piston 35 toward the disk member 53, the rod 84 is first urged by the control piston 35, and the valve member 58 is urged away from the valve seat 55 by the rod 84 to open the cut-off valve 82, 82'. This causes the input chamber 51 to be put into communication with the output chamber 48 through the annular flow passage 86, the orifice 88 and the communication passages 89. Then, the further movement of the control piston 35 toward the disk member 53 causes the valve seat piston 83, 83' to be urged by the control piston 35, so that the valve member portion 94 is moved away from the valve seat portion 95 to open the on-off valve 91. Thus, when the braking force is to be increased again, the cut-off valve 82, 82' is first opened to put the input chamber 51 into communication with the output chamber 48 through the orifice 88, and the on-off valve 91 is then opened, thereby causing the input chamber 51 to be put into communication with the output chamber 48 through the passage 90 parallel to the orifice 88.

Figure 7:
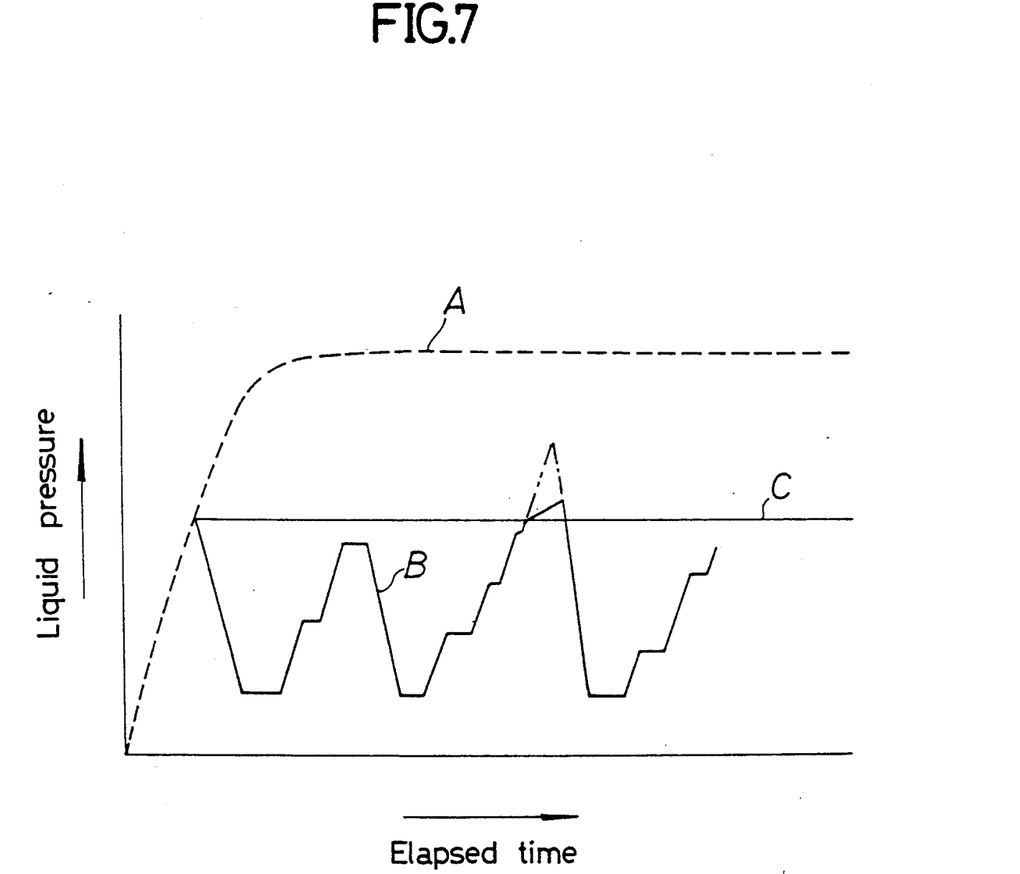
FIG. 7 is a diagram illustrating a hydraulic braking pressure characteristic during an anti-lock control operation.

The variation in braking pressure during such an anti-lock control operation will be described in connection with FIG. 7. When the output hydraulic pressure from the master cylinder 1 is indicated by a dashed line A, the hydraulic braking pressure in each of the brake cylinders $C_{FL}$, $C_{FR}$, $C_{RL}$ and $C_{RR}$ is varied as shown by a solid line B and can be controlled by the hydraulic braking pressure control system $M_{FL}'$, $M_{RL}'$, so that it would not largely exceed a hydraulic pressure C corresponding to a given slip rate. During reincreasing of the hydraulic braking pressure after reduction, a rapid flowing of a working liquid from the input chamber 51 into the output chamber 48 is avoided, because after opening of the cut-off valve 82, 82' to permit the communication between the input chamber 51 and the output chamber 48 through the orifice 88, the on-off valve 91 is opened later to permit the communication between the input chamber 51 and the output chamber 48 through the passage 90 parallel to the orifice 88, as described above. This ensures that the braking force can be increased while preventing a feeling of physical disorder from being imparted to a driver as a result of a rapid increase in amount of depression of the brake pedal 4.

As in the previously-described first embodiment, the cut-off valve 82 in the left rear wheel brake hydraulic braking pressure control system $M_{RL}'$ has a pressure-reducing function. In this way, the second embodiment, in addition to the effect of the previous first embodiment, provides an effect that a feeling of physical disorder cannot be imparted to the driver as a result of a rapid increase in amount of depression of the brake pedal 4 during reincreasing of the braking pressure.

What is claimed is:

1. A hydraulic braking pressure control system for a rear wheel brake, comprising: an output chamber defined in a housing to lead to a rear wheel brake cylinder; a control chamber defined in the housing and connected to a control hydraulic pressure source and a reservoir through a switchover valve means which is operable to selectively connect and disconnect said control hydraulic pressure source and said reservoir to said control chamber; a control piston being provided to have opposite end faces thereof facing the output chamber and the control chamber, respectively; a partition wall provided in the housing for partitioning said output chamber and an input chamber which is defined in the housing to lead to a master cylinder; and a cut-off valve interposed between said input and output chambers and movable to a closed position in response to movement of the control piston toward the control chamber, wherein said system further includes:

a sleeve slidably received in said housing with a back of the sleeve facing a pilot chamber leading to said control hydraulic pressure source and with a front end of the sleeve facing said output chamber, said control piston being slidably received in the sleeve and having a front end facing the output chamber and a rear end facing the control chamber defined between the control piston and the sleeve; and a lock valve interposed between the control chamber and the switchover valve means, said lock valve being movable to a closed position in response to movement of the sleeve in a direction to reduce a volume of the pilot chamber;

wherein said cut-off valve includes:

a valve seat piston formed into a stepped cylinder shape with a pressure-receiving area thereof facing said input chamber being smaller than a pressure-receiving area thereof facing said output chamber, said valve seat piston being slidably received in said partition wall with an end of the valve seat piston closer to the output chamber operatively connected to the front end of said sleeve, said valve seat piston having a valve seat at an end closer to the input chamber;

a spring interposed between said housing and said valve seat piston to provide an operative connection of said valve seat piston with the front end of said sleeve;

a valve member disposed in the input chamber and biased by a further spring in a direction to seat on the valve seat;

a rod for transmitting an operation of said control piston to said valve member; and a stopper fixedly disposed in the housing to restrict the maximum amount of movement of said valve member in the seating direction to a position at which the valve member is moved away from the valve seat upon the maximum movement of the valve seat piston permitted in response to the movement of said sleeve toward the pilot chamber.

2. A hydraulic braking pressure control system according to claim 1, further including a passage and an orifice provided in parallel with each other between said cut-off valve and said output chamber, and an on-off valve in said passage being operable to assume an opened position after said cut-off valve is opened.

3. A hydraulic braking pressure control system according to claim 2, wherein said input and output chambers are connected to each other by a through-hole provided in said valve seat piston, and said orifice is defined by said rod inserted through said through-hole and by an inner surface of said through-hole.

* * * * *